United States Patent [19]

McClinchy

[11] Patent Number: 4,723,733
[45] Date of Patent: Feb. 9, 1988

[54] METHOD OF DEICING COMMERCIAL, MILITARY AND PRIVATE AIRCRAFT

[76] Inventor: William McClinchy, 71 Ocean Ave., Center Moriches, N.Y. 11934

[21] Appl. No.: 853,124

[22] Filed: Apr. 17, 1986

Related U.S. Application Data

[63] Continuation-in-part of Ser. No. 718,650, Jun. 18, 1985, abandoned.

[51] Int. Cl.⁴ .............................................. B64D 15/10
[52] U.S. Cl. ............................ 244/134 C; 244/134 R
[58] Field of Search ................... 244/134 R, 134 C; 280/4; 239/159, 162, 170, 172, 150; 212/160, 165; 358/93, 100

[56] References Cited

U.S. PATENT DOCUMENTS

| | | | |
|---|---|---|---|
| 3,101,175 | 8/1963 | Brown, Jr. | 239/150 |
| 3,160,347 | 12/1964 | Ackley et al. | 239/159 |
| 4,073,437 | 2/1978 | Thorton-Trump | 239/172 |

FOREIGN PATENT DOCUMENTS

| | | | |
|---|---|---|---|
| 767362 | 3/1952 | Fed. Rep. of Germany | 244/134 C |
| 1149351 | 12/1957 | France | 212/160 |
| 2128842 | 5/1984 | United Kingdom | 358/100 |

*Primary Examiner*—Joseph F. Peters, Jr.
*Assistant Examiner*—Rodney Corl
*Attorney, Agent, or Firm*—Michael I. Kroll

[57] ABSTRACT

A mobile aircraft deicer having a base unit, a boom connected to the base unit, a deicer nozzle connected to the free end of the boom, and a television camera connected to the deicer nozzle.

3 Claims, 6 Drawing Figures

Fig. 1

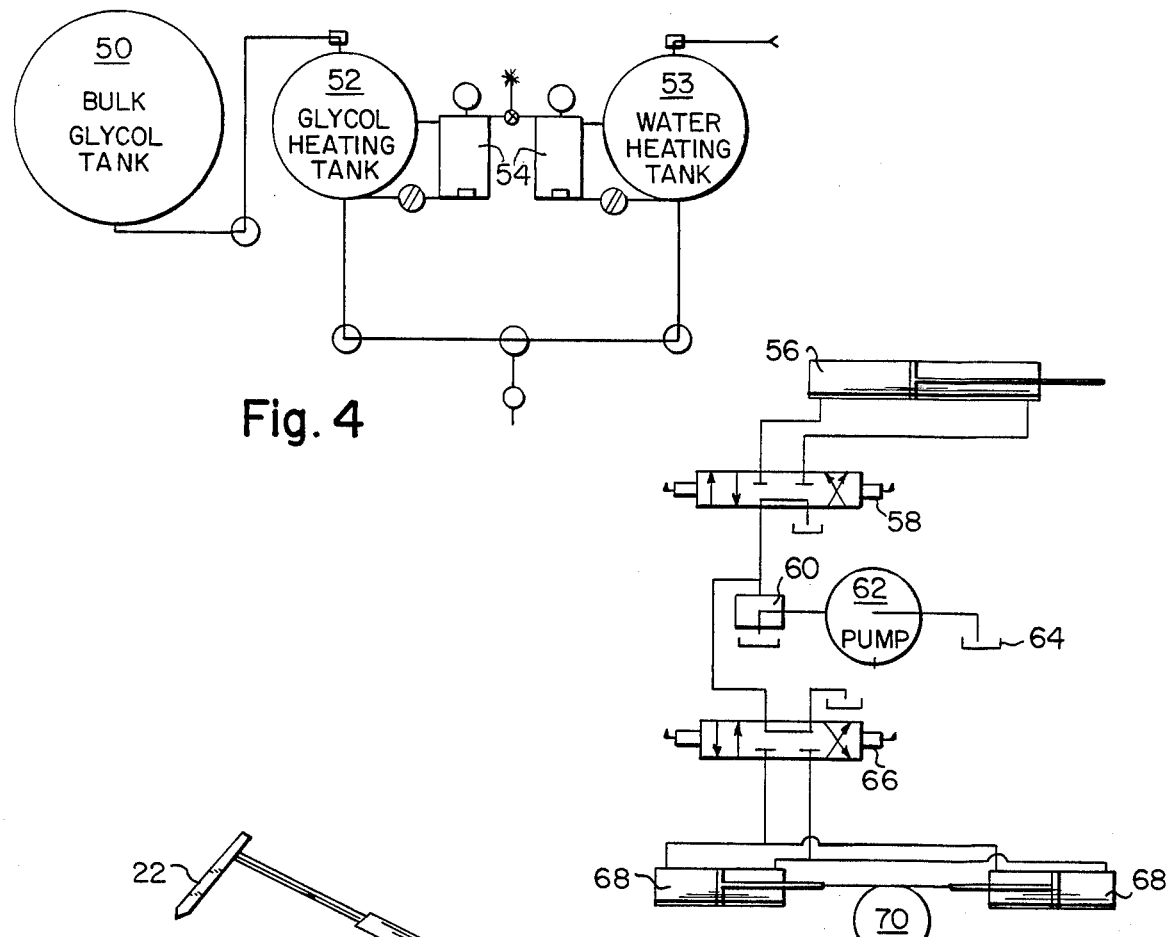
Fig. 4
Fig. 5
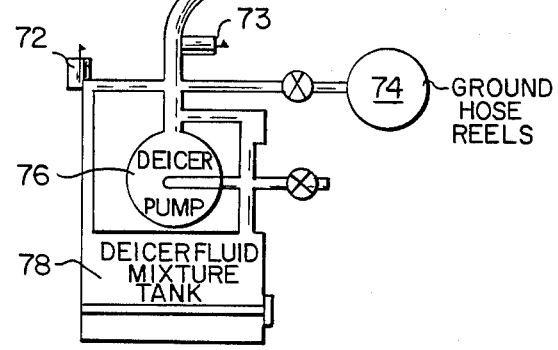
Fig. 6

METHOD OF DEICING COMMERCIAL, MILITARY AND PRIVATE AIRCRAFT

This application is a continuation in part of application Ser. No. 06/718,650 filed 06/18/85, now abandoned.

BACKGROUND OF THE INVENTION

1. Field of the Invention

The present invention relates generally to deicing apparatus. More particularly, it relates to a mobile aircraft deicer.

2. Description of Prior Art

U.S. Pat. No. 4,032,090 relates to a method for deicing an aircraft using water without glycol which would lead to icing up of the spray.

U.S. Pat. No. 4,191,348 relates to a deicing system limited to airline terminals and the length of the hose on the applicating vehicle. Additionally, the system is very costly and complex and must be installed when the terminal or airport is built.

SUMMARY OF THE INVENTION

Accordingly, it is an object of the present invention to provide a mobile aircraft deicer which avoids the disadvantages of the prior art.

More particularly, it is an object of the present invention to provide a mobile aircraft deicer which is safe, inexpensive and adjustable to different situations.

In keeping with these objects, and with others which will become apparent hereinafter, one feature of the present invention resides, briefly stated, in a mobile aircraft deicer having a base unit, a boom connected to the base unit, a deicer nozzle connected to the telescoping boom, wherein a television camera is connected to the deicer nozzle.

When the mobile aircraft deicer is designed in accordance with the present invention, the deicing of the aircraft on the ground can be accomplished with the operator disposed in a position remote from the aircraft.

In accordance with another feature of the present invention, the base unit is a truck.

Another feature of the present invention is that the boom has an extended position and a retracted position.

Still another feature of the present invention is that the truck contains a module that is removable and includes all the necessary components to operate the deicer.

Finally, still a further feature of the present invention is that the truck includes a VCR to permanently record what the television picks up.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

The novel features which are considered characteristic for the invention are set forth in particular in the appended claims. The invention itself, however, both as to its construction and its method of operation, together with additional objects and advantages thereof, will be best understood from the following description of specific embodiments.

BRIEF DESCRIPTION OF THE DRAWINGS

FIG. 4 is a schematic of a centrally located installation for preheating and preportioning deicer fluid in bulk quantities;

FIG. 5 is a schematic view of the hydraulic boom and slew control; and

FIG. 6 is a schematic view of the deicer fluid system.

DETAILED DESCRIPTION OF THE PREFERRED EMBODIMENTS

Figure 1:
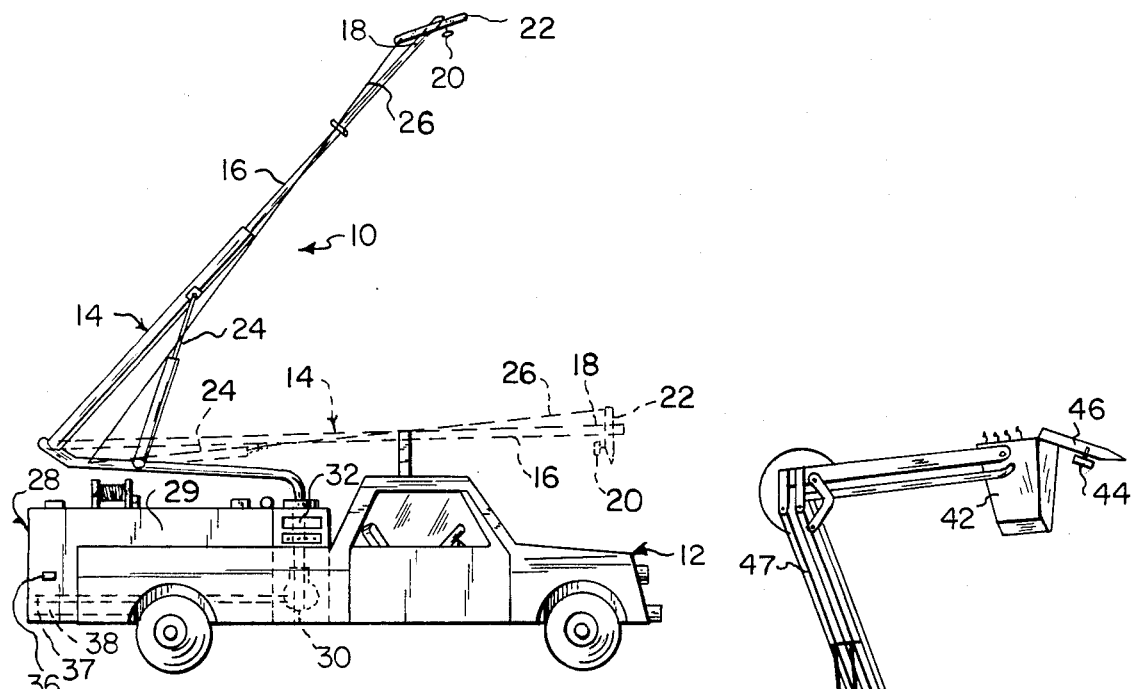
FIG. 1 is a side view of the present invention.

Referring now to FIG. 1, the present invention is shown generally at 10 and includes a truck portion 12 and a boom portion 14.

The boom portion 14 contains a telescoping portion 16. At the remote end 18 of the boom 14 is fixed a TV pick up 20 and a deicer fluid discharge nozzle 22. The TV pickup 20 is mounted on the nozzle 22.

The boom 14 is raised and lowered by hydraulic lift cylinders 24. Along the length of the boom 14 is a discharge nozzle and TV pickup position actuator link 26. The phantom lines in FIG. 1, show the boom 14 in the retracted position.

The truck portion 12 contains a completely independent module 28 which includes all the deicing apparatus, such as, support member 33 the deicer fluid tank 29, deicer fluid pump/engine, hydraulic pump and controls 30, oil and gas tanks 32, batteries 31, and TV monitor 35. A tank containing the deicer fluid 29 is also present.

At the rear of the truck portion 12 is located the immersion heaters 36 and fork lift slots 38 so that the tank 29 can be removed from the truck 12, if necessary. There is also an exhaust heater 37 passing through the tank 29.

Figure 3:
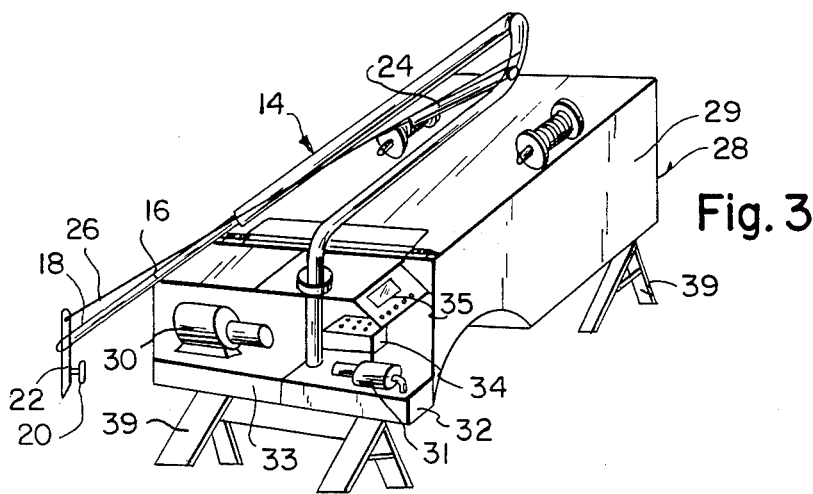
FIG. 3 is a perspective view of the fluid tank and its accessories.

FIG. 3 shows the tank 29 removed from the truck 12 and resting on horses 39 making the conversion portable.

Figure 2:
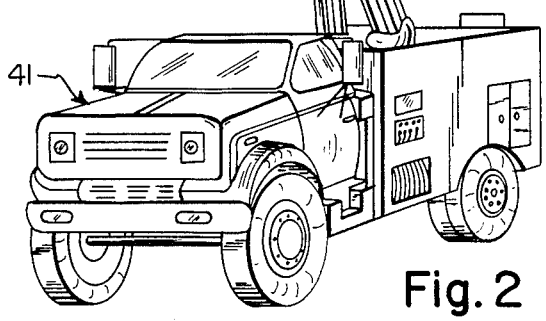
FIG. 2 is a perspective view of an alternate embodiment of the present invention.

FIG. 2 shows an alternate embodiment where an existing boom truck 41 is converted to a deicer unit. The bucket 42 remains in tack, however, the TV pickup 44 and nozzle 46 is mounted at the far end of the boom 47. The existing boom truck 41 is modified to contain all the necessary apparatus as used in the preferred embodiment depicted in FIGS. 1 and 3. Thus, existing trucks 41 can be used with modifications to implement the present invention.

FIG. 4 is the schematic for a centrally located facility for heating and mixing Glycol and water in the proper proportions to meet weather conditions within the hour. The tanks, 50, 52 and 53 are all sized to requirements. The polyeurethane tanks are insulated, buried or housed, depending on preference. The heating boilers 54 and accessories valves are all standard hot water system components.

FIG. 5 is the schematic for the hydraulic boom and slew controls for vehicle shown in FIG. 1. 56 is the pipe boom cylinder. 58 is the boom hydraulic controls. 60 is the relief valve. 62 is the pump. 64 is the tank. 66 is the slew hydraulic controls. 68 is the pipeboom slew cylinder. 70 is the boom slew cable sheave.

FIG. 6 is a schematic of the deicer fluid system on the vehicle shown in FIG. 1. The deicer nozzle 22 is connected to the telescoping boom portion 16 of the pipe boom. 72 is the heater circulating solenoid valve. 73 is the deicer nozzle solenoid valve. 74 is the ground hose reels. 76 is the deicer pump. 78 is the deicer fluid mixture tank.

The present invention 10 provides a mobile, portable arrangement for deicing the wings of ground aircraft. The main advantage is that the deicing can be done from a remote position because of the use of a TV camera and possible VCR. This type of arrangement is safer and protects the operator from the elements.

Due to better mixture control there is a savings on the Glycol. The aircraft becomes safer and there is a VCR record of deicer fluid application. Additionally, there is no open flame, the deicer fluid is heated by two million B.T.U. heaters driven on the aircraft loading gates.

It will be understood that each of the elements described above, or two or more together, may also find a useful application in other types of methods and constructions differing from the types described above.

While the invention has been illustrated and described as embodied in a mobile aircraft deicer, it is not intended to be limited to the details above, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. A mobile aircraft deicer, comprising:
  (a) a base unit including a conventional truck having a rear portion containing fork lift slots and immersion heaters;
  (b) a boom connected to said truck and having a free end;
  (c) a deicer nozzle connected to said free end of said boom;
  (d) a television camera connected to said deicer nozzle so that the deicing of the aircraft on the ground can be accomplished with the operator disposed in a position remote from the aircraft; and
  (e) a completely independent self-contained portable deicing apparatus module removably mounted to said rear portion of said conventional truck and including said boom, a deicer fluid tank, a deicer fluid pump/engine, hydraulic pump and controls, oil and gas tanks, batteries, and a TV monitor, said fork lift slots of said rear portion of said conventional truck allowing said module to be readily removed from said conventional truck when said module is serviced or when said conventional truck is used for non-deicing purposes.

2. A deicer as defined in claim 1, wherein said boom has an extended position and a retracted position.

3. A deicer as defined in claim 1, wherein said truck includes a VCR to permanently record what said TV picks up.

* * * * *